United States Patent [19]

Takeuchi et al.

[11] 4,407,905
[45] Oct. 4, 1983

[54] FUEL CELL

[75] Inventors: Seizi Takeuchi, Hitachiota; Kenzo Ishii, Hitachi; Toshiki Kahara, Tokaimura; Jinichi Imahashi, Hitachi; Masato Takeuchi, Katsuta; Hideo Okada; Sigeru Okabe, both of Hitachi; Shimpei Matsuda, Tokaimura; Fumito Nakajima, Hitachi; Hirosi Tobita, Kitaibaraki; Kohki Tamura, Hitachi, all of Japan

[73] Assignee: Hitachi, Ltd., Tokyo, Japan

[21] Appl. No.: 311,179

[22] Filed: Oct. 14, 1981

[30] Foreign Application Priority Data

Oct. 14, 1980 [JP] Japan ................... 55-142378

[51] Int. Cl.³ ............................... H01M 4/86
[52] U.S. Cl. .......................... 429/42; 429/44; 429/46
[58] Field of Search ............ 429/42, 44, 40, 41, 429/45

[56] References Cited

U.S. PATENT DOCUMENTS

| | | | |
|---|---|---|---|
| 3,274,031 | 9/1966 | Maget et al. | 429/44 X |
| 3,310,434 | 3/1967 | Kordesch | 429/40 X |
| 3,432,362 | 3/1969 | Kroll | 429/42 X |
| 3,438,815 | 4/1969 | Giner | 429/44 X |
| 3,442,714 | 5/1969 | Matsuno | 429/40 X |
| 4,017,664 | 4/1977 | Breault | 429/44 |
| 4,166,143 | 8/1979 | Petrow et al. | 429/42 X |
| 4,235,748 | 11/1980 | Berchielli et al. | 429/42 X |
| 4,263,376 | 4/1981 | Blurton | 429/42 |

*Primary Examiner*—Charles F. LeFevour
*Attorney, Agent, or Firm*—Antonelli, Terry & Wands

[57] ABSTRACT

Fuel cell with improved and stabilized electrode performance having at least one gas diffusion electrode, where the gas diffusion electrode comprises an electronconductive, gas-permeable substrate and an electrode catalyst uniformly distributed on the substrate, the electrode catalyst comprising colonies each consisting of not more than 20 primary particles of noble metal each having a size of 10-30 Å and being uniformly distributed and deposited on carrier powder.

32 Claims, 3 Drawing Figures

FUEL CELL

BACKGROUND OF THE INVENTION

The present invention relates to a fuel cell, and more particularly to a fuel cell having at least a gas diffusion electrode having an electrode catalyst prepared by uniformly distributing and depositing noble metal particles on catalyst carriers. The present invention is suitable for a phosphoric acid fuel cell or a methanol fuel cell.

Sites of reaction among an aqueous solution containing ions that take part in the reaction, an electron conductor that can pass electrons therethrough, and a reacting gas such as hydrogen gas or oxygen gas are given at both anode and cathode in the case of the phosphoric acid fuel cell, and at the cathode in the case of the methanol fuel cell, where the electrodes work as three-phase boundary electrodes of liquid, solid and gas, the so-called gas diffusion electrodes. The gas diffusion electrode is prepared, for example, by coating carbon paper of carbon fibers as a substrate with carbon powder supporting electrode catalyst particles of noble metal such as platinum by means of a binder such as polytetrafluoroethylene i.e. Teflon.

The electrode thus prepared has a good gas permeability, and can retain the aqueous solution containing ions within the electrodes thanks to the surface tension due to water repellency of polytetrafluoroethylene and hydrophilic properties of carbon without permeation of the aqueous solution to the other side of the electrode.

The gas diffusion electrode has many pores, and forms three-phase boundries where the three phases of liquid, solid and gas are in contact with one another, and the reacting hydrogen or oxygen gas can diffuse therein to undergo reaction at the boundaries.

To increase a current density, it is necessary to form more site of such reactions (active points), thereby increasing the activity of electrode catalyst.

Generally, the activity of noble metal electrode catalyst can be increased by making noble metal particles finer and uniformly distributing the finer particles onto carriers.

Many procedures for preparing noble metal electrode catalyst have been so far known, and the ordinary procedure comprises, for example, dipping activated carbon or carbon black in an aqueous chloroplatinic acid solution and wet-reducing the chloroplatinic acid by a chemical or dry-reducing it by a reducing gas. One of the recently proposed procedures comprises forming a platinum sulfite complex salt and oxidizing the complex salt, thereby depositing fine platinum particles on carriers (Japanese Laid-open patent application No. 88,478/76), and another procedure comprises depositing platinum particles of less than 50 Å onto carbon carriers from an aqueous chloroplatinic acid solution by sodium dithionate and hydrogen peroxide (Japanese Laid-open patent application No. 92,588/74).

On the other hand, procedures for preparing a colloid dispersion of platinum particles by means of polyvinyl alcohol as a protective colloid were reported in J. Am. Chem. Soc., 63, 2745 (1941) and recently in Hyomen (Surface) 17, (4), 279–289 (1979).

However, the former procedures require complicated steps and have such disadvantages as poor deposition of platinum particles onto carriers, depending upon the species of carriers. In the latter procedures using the protective colloid, no disclosure has been made yet at all as to influences by the presence of carbon carriers.

SUMMARY OF THE INVENTION

An object of the present invention is to provide a fuel cell having at least one gas diffusion electrode with a good electrode performance, prepared from a noble metal electrode catalyst free from the above-mentioned disadvantages.

The present inventors have found that deposition of noble metal particles onto carriers can be improved by preparing the catalyst while changing the surface state of catalyst carriers and the species and the amount of protective colloid, and the noble metal particles can be uniformly distributed and supported on the carriers thereby.

Furthermore, the present inventors have found that the noble metal particles can be more uniformly distributed and made finer on the carriers or distribution of the electrode catalyst within the electrode can be improved by addition of graphite fluoride when the electrode catalyst is prepared, or when a gas diffusion electrode is prepared from the thus prepared electrode catalyst. The present invention is based on the finding of these new facts.

The present invention provides a fuel cell having, as a gas diffusion electrode, at least one electrode prepared by preparing an electrode catalyst having colonies each consisting of not more than about 20, preferably less than about 10 to a few primary particles of noble metal, each primary particles having particle sizes of 10–30 Å, uniformly distributed and supported on carriers from an aqueous solution containing noble metal ions, or complex noble metal ions, a protective colloid, and carrier powder, together with a reducing agent, and, if necessary, graphite fluoride, and by mixing the thus prepared electrode catalyst with a water repellent and water, if necessary, together with carbon fibers, and further with graphite fluoride, coating an electron-conductive, gas-permeable substrate with the resulting mixture, and baking the thus coated electrode.

Production of a gas diffusion electrode applicable to the present fuel cell will be described in detail below.

The noble metal to be used as a catalyst metal in the present invention is one of noble metals belonging to group VIII of the periodic table, or their mixture, preferably Pt, Pd, Rb, Ru or Ir, or their mixture, more preferably Pt.

The amount of noble metal to be used for the electrode catalyst of the present fuel cell is generally 0.1–20% by weight on the basis of the electrode catalyst, and preferably 1–10% by weight in view of relations between the amount of noble catalyst per unit area of the electrode and cell performance.

As the catalyst carrier, carbonaceous powder, such as commercially available graphite, carbon black (for example, acetylene black), activated carbon, etc. or their mixture can be used. It is necessary that the catalyst carrier be in the form of powder, which can attain fine and uniform distribution of noble metal particles.

As the reducing agent, various kinds of reducing agents can be used, but alcohol or ether is preferable in the present invention. Methanol is most preferable among them. Particle size and particle size distribution of noble metal particles to be deposited on the carriers depend upon the species of the reducing agent, and the particle size of noble metal can be made much smaller and the particle distribution can be also made narrower by using alcohol, particularly methanol as the reducing agent. Besides methanol, ethanol, isopropanol, 2-methoxyethanol or 1,2-dimethoxyethane can be used as the alcohol or ether. An appropriate amount of the reducing agent is 10–90% by volume on the basis of the aqueous solution for preparing the electrode catalyst.

As the protective colloid for the present invention, a hydrophilic polymer compound is desirable. Since the noble metal particles to be deposited onto the carriers are water-repellent, and are liable to coagulate one with another in water. To prevent coagulation of noble metal particles and improve a dispersion of the particles in water, a protective colloid is used. The protective colloid is attached to the surfaces of noble metal particles by adsorption and prevents the coagulation of the particles. Examples of the hydrophilic polymer compound include polyvinyl alcohol, polymethylvinyl ether, polyvinyl pyrrolidone, polymethyl methacrylate, alkylarylpolyether alcohol, gelatin, gum arabic, etc. An appropriate ratio of the protective colloid to the noble metal is 0.1–50 by weight.

An appropriate amount of graphite fluoride to be used, when necessary, in the present invention is 10–80% by weight on the basis of the electrode catalyst, i.e. total of noble metal and carriers.

In the preparation of electrode catalyst in the present invention, it is most important that the size and distribution of noble metal particles to be deposited onto the carriers greatly depend upon the species and concentration of the reducing agent and the ratio by weight of the protective colloid to the noble metal in a mixture of carriers, reducing agent, protective colloid and noble metal ions or complex ions. That is, the noble metal particles formed by reduction in the liquid phase are hydrophobic and coagulate one with another to initiate growth of the particles when there is no protective colloid. If there is a protective colloid in the liquid phase, the noble metal particles are attracted to the surfaces of the hydrophilic polymer compounds as the protective colloid by adsorption, and the surfaces of the noble metal particles are covered by the hydrophilic groups to prevent coagulation.

A typical example of preparing an electrode catalyst according to the present invention, that is, a case of supporting 10% by weight of platinum particles on acetylene black carriers, will be described below.

In the case of using a mixture of water and methanol (1:1 by volume) as a reducing agent, the particle size of platinum particles on the carriers reaches a few hundrent to a few thousand Å, if there is no protective colloid, as shown in the electron microscope picture of FIG. 1, where the black masses show large colonies of the large particles, clear grey and dark grey masses show carbon powder, and white parts show that there exists nothing. However, when polyvinyl alcohol is added thereto as the protective colloid in a ratio of polyvinyl alcohol to platinum of about 1.0 by weight, the particle size each of primary platinum particles becomes 10–30 Å, and colonies consisting of about 10 to about 20 primary platinum particles are uniformly distributed on the carriers, as shown in the electron microscope picture of FIG. 2.

If the ratio of polyvinyl alcohol to platinum is less than 0.1 by weight, colonies consisting of much more than about 20 primary platinum particles are liable to be deposited onto the carriers. On the other hand, if the ratio exceeds 20 by weight, the platinum particles are not quantitatively deposited onto the carriers. In a ratio of more than 50 by weight, it is very difficult to carry out solid-liquid separation after the preparation of electrode catalyst.

If the amount of platinum on the carriers exceeds 20% by weight, the amount of chloroplatinic acid must be increased in the aqueous solution for preparing the electrode catalyst, resulting in decrease in pH of the aqueous solution and consequent decrease in the activity of protective colloid. That is, the degree of distribution of platinum particles is impaired. In that case, the desired amount of platinum particles can be deposited onto the carriers by neutralizing the aqueous solution with caustic alkali or alkali carbonate to keep the initial pH value constant, usually at 1.5 to 3.5, irrespective of the amount of chloroplatinic acid to be used.

In the present invention, number of primary particles having the size of 10–30 Å, constituting a colony, can be always kept to less than about 10 by adding graphite fluoride particles to the aqueous solution for preparing the electrode catalyst. In the electron microscope picture of FIG. 3, colonies consisting of a few primary particles are deposited in the carriers thereby. That is, addition of graphite fluoride can reduce the number of the primary particles constituting a colony from about 10—about 20 when no graphite fluoride is added thereto to less than about 10—a few, though the particle size of the primary particles on the carriers is not changed. That is, the degree of distribution is considerably improved.

In the present invention, a noble metal particle having the size of 10–30 Å is regarded as a primary particle. The size corresponds to the half value width of 0.091–0.0460 in X ray diffraction peak of platinum metal at the plane (111) when the target is a CuKα ray (1.5405 Å).

The present electrode catalyst can be prepared by heating the aqueous solution containing noble metal ions or noble metal complex ions, a protective colloid, and a carrier powder together with a reducing agent at about 70° C. for 2 to 6 hours. By the proper adjustment of mixing proportions of the respective components, as described above, colonies consisting of about 10 to about 20 primary particles of noble metal having the size of 10–30 Å can be deposited on the carriers. When graphite fluoride is added to the aqueous solution in the proportion as described above, colonies conninsting of less than about 10 to a few primary particles of noble metal can be deposited on the carriers.

In the preparation of the present electrode catalyst, it is sometimes preferable to heat the resulting electrode catalyst, depending upon the species of protective colloid to be used. Of course, some species of protective colloid requires no heating at all. The heating is to thermally decompose the protective colloid existing on the surfaces of the noble metal particles on the carriers. The heating can be carried out in the atmosphere of oxidizing gas, reducing gas or inert gas. Preferable heating temperature is 50°–350° C. for the atmosphere of oxidizing gas, or 50°–1,000° C. for the atmosphere of reducing gas or inert gas. Best catalytic activity can be obtained by repeated heating in the alternated atmospheres of oxidizing gas and reducing gas.

A gas diffusion electrode is prepared from the thus prepared electrode catalyst according to the ordinary procedure. That is, at first, the thus prepared electrode catalyst is mixed with water and a water repellent, where the water repellent is used to give a proper binding and water repellency to the electrode. As the water repellant, a polytetrafluoroethylene (Teflon) dispersion is preferable.

When carbon fibers are added to the mixture, they can serve to increase the mechanical strength of catalyst layers.

When the electrode components are mixed together, it is preferable to use a dispersing agent to effect uniform mixing. Examples of the dispersing agent include alcohol, surfactants, etc.

Then, the resulting mixture is applied to an electron-conductive, gas-permeable substrate according to the ordinary procedure. The ordinary electron-conductive, gas-permeable substrate, such as carbon paper, is used for this purpose. Then, the thus coated substrate is baked in the air, or in the atmosphere of inert gas, such as a nitrogen gas at a temperature of 310°–340° C.

When graphite fluoride is used in the preparation of electrode catalyst or electrode, the amount of the water repellent can be decreased in the preparation of the electrode, and also the inner resistance of the electrode can be reduced.

PREFERRED EMBODIMENTS OF THE INVENTION

Figure 1:
FIG. 1 is an electron microscope picture of an electrode catalyst prepared without using a protective colloid.
Figure 2:
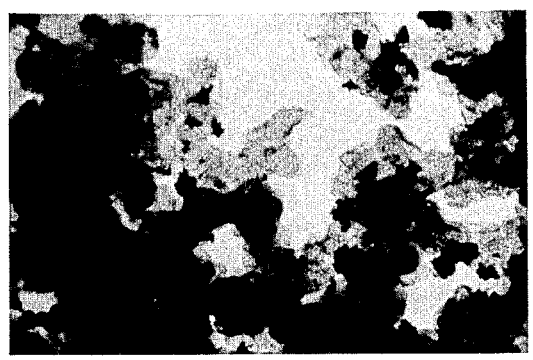
FIG. 2 is an electron microscope picture of an electrode catalyst prepared with a protective colloid.
Figure 3:
FIG. 3 is an electron microscope picture of an electrode catalyst prepared with a protective colloid and graphite fluoride.

Preparation of electrode catalysts, preparation of gas diffusion electrodes from the resulting electrode catalysts, and performance of the resulting electrodes as cathodes against the reference hydrogen electrode will be described in detail below:

First of all, preparation of electrode catalysts will be shown as Preparatory Examples.

PREPARATORY EXAMPLE 1

1.0 g of commerically available polyvinyl alcohol was dissolved in an aqueous solution of 250 ml of methanol and 225 ml of water. 25 ml of an aqueous chloroplatinic acid solution containing 20 mg Pt/ml and then 5.0 g of commercially available acetylene black were added thereto to prepare an aqueous solution for preparing an electrode catalyst. Then, the aqueous solution was transferred into a round bottom flask with a radius cooler and heated at about 70° C. with vigorous stirring under reflux. About 4 hours after the start of reaction, more than 99% of platinum in the aqueous solution was deposited onto the actylene black to obtain a platinum catalyst supported on the acetylene black.

The catalyst was water-washed and dried, and electron microscope observation revealed that colonies each consisting of about 10 to about 20 primary particles of platinum each having the size of 10–30 Å were uniformly distributed and deposited on the carriers.

PREPARATORY EXAMPLE 2

1.0 g of commercially available polyvinyl alcohol was dissolved in an aqueous solution of 250 ml of an aqueous chloroplatinic acid solution containing 20 mg Pt/ml, and then 5.0 g of commercially available acetylene black were added thereto. The resulting aqueous solution was heated in the same manner as in Preparatory Example 1, and about 4 hours after the start of reaction, more than 99% of platinum in the solution was deposited onto the acetylene black carriers. The similar observation as in Preparatory Example 1 revealed that colonies each consisting of about 20 primary particles of platinum each having the size of 10–30 Å were uniformly distributed and deposited on the carriers.

PREPARATORY EXAMPLE 3

50 ml of an aqueous 10 wt. % solution of octylphenoxyethoxyethanol (Toriton X-100, a trade mark) was added to an aqueous solution of 250 ml of methanol and 175 ml of water, and then 25 ml of an aqueous chloroplatinic acid solution containing 20 mg Pt/ml and then 5.0 g of commercially available acetylene black were added thereto. The resulting aqueous solution was heated in the same manner as in Preparatory Example 1, and about 4 hours after the start of reaction, more than 99% of platinum in the aqueous solution was deposited onto the acetylene black carriers. The similar observation as in Preparatory Example 1 revealed that colonies each consisting of a few primary particles of platinum each having the size of 10–30 Å were uniformly distributed and deposited on the carriers.

PREPARATORY EXAMPLE 4

10 g of polyvinyl alcohol was added to an aqueous solution of 250 ml of methanol and 220 ml of water, and 25 ml of an aqueous chloroplatinic acid containing 20 mg Pt/ml and 5 ml of an aqueous gold chloride solution containing 10 mg Au/ml, and then 5.0 g of acetylene black were added thereto. The resulting aqueous solution was heated in the same manner as in Preparatory Example 1, and about 4 hours after the start of reaction, more than 99% of platinum and gold in the aqueous solution were deposited onto the acetylene black. The similar observation as in Preparatory Example 1 revealed that colonies each consisting of about 10 to about 20 primary particles of platinum each having the size of 10–30 Å were uniformly distributed and deposited on the carriers, and particles having the size of about 15 Å, which were presumed to be particles of gold, were uniformly distributed and deposited on the carriers without forming colonies.

COMPARATIVE PREPARATORY EXAMPLE

Electrode catalyst was prepared in the same manner as in Preparatory Example 1 without using polyvinyl alcohol. More than 99% of platinum in the aqueous solution was deposited onto the carriers about 4 hours after the start of reaction, but the similar observation as in Preparatory Example 1 revealed that the primary particles of platinum were hardly distinguished, and large masses of platinum each having the size of several thousand Å were unevenly distributed and deposited on the carriers.

PREPARATORY EXAMPLE 5

1.5 g of graphite fluoride was added to the aqueous solution for preparing the electrode catalyst, prepared in Preparatory Example 1, and the resulting aqueous solution was heated in the same manner as in Preparatory Example 1. 4-6 hours after the start of reaction, more than 99% of platinum in the aqueous solution was deposited onto the carriers. The similar observation as in Preparatory Example 1 revealed that colonies each consisting of a few primary particles of platinum each having the size of 10–30 Å were uniformly distributed and deposited on the carriers.

PREPARATORY EXAMPLE 6

2.0 g of polyvinyl alcohol was added to an aqueous solution of 250 ml of isopropanol and 100 ml of water, and then 100 ml of an aqueous chloroplatinic acid solution containing 20 mg Pt/ml was added thereto. pH of the resulting solution was adjusted to 2.2 with aqua ammonia and made total 500 ml with distilled water. Then, the aqueous solution was admixed with 20 g of graphite and 2.0 g of graphite fluoride, and then heated in the same manner as in Preparatory Example 1. 4–6 hours after the start of reaction, more than 95% of platinum in the aqueous solution was deposited onto the graphite carriers. The similar observation as in Preparatory Example 1 revealed that colonies each consisting of less than 10 primary particles of platinum each having the size of 10–30 Å were uniformly distributed and deposited on the carriers.

PREPARATORY EXAMPLE 7

1.0 g of polyvinyl alcohol was added to an aqueous solution of 100 ml of methanol and 375 ml of water, and then 25 ml of an aqueous chloroplatinic acid solution containing 20 mg Pt/ml and then 5 g of acetylene black and 2.0 g of graphite fluoride were added thereto. The resulting aqueous solution was heated in the same manner as in Preparatory Example 1. 4–6 hours after the start of reaction, more than 99% of platinum in the aqueous solution was deposited onto the acetylene black carriers. The similar observation as in Preparatory Example 1 revealed that colonies each consisting of a few primary particles each having the size of 10–30 Å were uniformly distributed and deposited on the carriers.

In the following Examples, electrodes were prepared from the electrode catalysts prepared according to the foregoing Preparatory Examples and Comparative Preparatory Example, and their performance as single electrodes working as cathode was evaluated.

EXAMPLE 1

1 g of each of the electrode catalysts prepared according to Preparatory Examples was weighed out, and each was admixed with an aqueous 25 vol. % ethanol solution and then throughly kneaded. Then, 50% by weight of a polytetrafluoroethylene dispersion was added thereto on the basis of the electrode catalyst, and further kneaded. Then, the kneaded mixture was applied to carbon paper as a substrate, and the coated substrate was thoroughly dried in the air, and then further dried at 130° C. for 2 hours, and baked at 340° C. for 20 minutes in the air to prepare test electrodes.

The test electrodes were evaluated as single electrodes working as cathode against the reference hydrogen electrode in phosphoric acid at 190° C. The results are given in Table 1.

TABLE 1

| Current density ($mA/cm^2$) | Potential over reference hydrogen electrode | | | |
|---|---|---|---|---|
| | Prep. Ex. 1 [A] | Prep. Ex. 2 [B] | Prep. Ex. 3 [C] | Prep. Ex. 4 [D] |
| 50 | 0.80 | 0.80 | 0.82 | 0.80 |
| 100 | 0.76 | 0.74 | 0.77 | 0.74 |
| 150 | 0.72 | 0.70 | 0.73 | 0.70 |
| 200 | 0.67 | 0.64 | 0.67 | 0.65 |

COMPARATIVE EXAMPLE

An electrode was prepared from the electrode catalyst of Comparative Preparatory Example in the same manner as in Example 1, and its single electrode performance as cathode was evaluated. The results are given in Table 2.

TABLE 2

| Current density ($mA/cm^2$) | Potential over reference hydrogen electrode (V) |
|---|---|
| 10 | 0.80 |
| 30 | 0.77 |
| 50 | 0.68 |
| 100 | 0.58 |

EXAMPLE 2

The electrodes [A] were prepared according to Example 1 by varying the baking temperature to determine the optimum range of baking temperature in the air. Baking time was 20 minutes. The results are given in Table 3.

TABLE 3

| Current density ($mA/cm^2$) | Potential over reference hydrogen electrode (V) Baking temp. (°C.) | | | | | | | | |
|---|---|---|---|---|---|---|---|---|---|
| | 290 | 300 | 310 | 320 | 330 | 340 | 350 | 360 | 370 |
| 10 | Impossible to measure | 0.93 | 0.93 | 0.93 | 0.93 | 0.93 | 0.91 | 0.89 | 0.86 |
| 100 | Impossible to measure | 0.74 | 0.76 | 0.76 | 0.75 | 0.76 | 0.74 | 0.72 | 0.69 |
| 200 | Impossible to measure | 0.66 | 0.69 | 0.69 | 0.66 | 0.69 | 0.66 | 0.64 | 0.60 |

As is evident from Table 3, no difference was observed in electrode performance in the range of baking temperature of 310°–340° C.

EXAMPLE 3

Electrodes [A] were prepared according to Example 1 by adding carbon fibers to the mixture to determine the effect of adding carbon fibers. That is, 20, 40, or 60% by weight of carbon fibers (up to 5 μm in diameter and 0.2 mm long) were added per gram of electrode catalyst, and thoroughly pulverized and mixed. Then, the resulting mixture was admixed with an aqueous 50 vol. % ethanol solution and kneaded. Then, 24% by weight of a polytetrafluoroethylene dispersion was added thereto on the basis of the electrode catalyst, and kneaded. The resulting mixture was applied to carbon paper as a substrate, dried in the air, and further dried and baked at 340° C. for 20 minutes in the air. The single electrode performance of the resulting electrode as cathode was evaluated. The results are given in Table 4.

TABLE 4

| Current density (mA/cm²) | Potential over reference hydrogen electrode (V) | | | |
|---|---|---|---|---|
| | 0 | 20 wt. % | 40 wt. % | 60 wt. % |
| 50 | 0.80 | 0.82 | 0.82 | 0.81 |
| 100 | 0.76 | 0.78 | 0.77 | 0.75 |
| 150 | 0.72 | 0.74 | 0.72 | 0.71 |
| 200 | 0.67 | 0.69 | 0.67 | 0.66 |

As is evident from Table 4, the electrode performance was a little improved by adding carbon fibers to the mixture when the electrode catalyst was kneaded. In addition, the mechanical strength such as prevention of the electrode catalyst from release from the coated substrate, etc. could be considerably improved by adding the carbon fibers thereto.

EXAMPLE 4

The electrode catalysts prepared according to Preparatory Examples 5 and 7 were heated in a nitrogen gas stream at 400° C. for two hours, and then 10% by weight of a polytetrafluoroethylene dispersion in terms of polytetrafluoroethylene was added thereto to give binding and water repellency to the electrodes. After the kneading, the resulting mixture was applied to carbon fiber sheets, and then the coated sheets were baked in a nitrogen gas stream at 400° C. for two hours to form electrodes. The resulting electrodes had 0.45 mg/cm² of platinum, and their electrode performance as cathode was evaluated at 190° C. in an electrolyte of 96% $H_3PO_4$. The results are given in Table 5.

TABLE 5

| Current density (mA/cm²) | Potential over reference hydrogen electrode (V) | |
|---|---|---|
| | Catalyst of Prep. Ex. 5 | Catalyst of Prep. Ex. 7 |
| 50 | 0.81 | 0.80 |
| 100 | 0.77 | 0.77 |
| 150 | 0.73 | 0.73 |
| 200 | 0.69 | 0.69 |

As is evident from Table 5, a good potential such as 0.69 V could be obtained at the current density of 200 mA/cm².

EXAMPLE 5

Electrodes were prepared from the electrode catalysts of Preparatory Examples 5 and 7 except that the electrode catalysts were heated in the air at 300° C. for two hours, and their performance as cathode were evaluated. The results are given in Table 6.

TABLE 6

| Current density (mA/cm²) | Potential over reference hydrogen electrode (V) | |
|---|---|---|
| | Catalyst of Prep. Ex. 5 | Catalyst of Prep. Ex. 7 |
| 50 | 0.86 | 0.83 |
| 100 | 0.82 | 0.79 |
| 150 | 0.78 | 0.75 |
| 200 | 0.72 | 0.70 |

As is evident from Table 6, good potentials such 0.7–0.8 V were obtained at all the given current densities.

EXAMPLE 6

Electrodes were prepared from the electrode catalysts of Preparatory Examples 1 and 5 in the same manner as in Example 5, and electrode was prepared by adding the same amount of graphite fluoride as in Preparatory Example 5 to the mixture when the electrode was prepared from the electrode catalyst of Preparatory Example 1 in the same manner as in Example 5. Their performance as cathode was evaluated for 7 sheets each to determine the degree of fluctuation at a current density of 100 mA/cm². The results are shown in Table 7.

TABLE 7

| Sheet No. | Potential over reference hydrogen electrode (V) | | |
|---|---|---|---|
| | Catalyst of Prep. Ex. 5 | Catalyst of Prep. Ex. 1 | Catalyst of Prep. Ex. 1 + Graphite fluoride |
| 1 | 0.82 | 0.78 | 0.78 |
| 2 | 0.81 | 0.68 | 0.77 |
| 3 | 0.82 | 0.69 | 0.77 |
| 4 | 0.79 | 0.73 | 0.76 |
| 5 | 0.83 | 0.65 | 0.76 |
| 6 | 0.79 | 0.78 | 0.78 |
| 7 | 0.82 | 0.66 | 0.74 |

As is evident from Table 7, all the electrodes have good performance and less degree of fluctuation, and addition of graphite fluoride to the aqueous solution for preparing the electrode catalyst is most effective.

It is evident from the foregoing that the noble metal particles on the carriers as electrode catalyst can be made fine and uniformly distributed and deposited in the present invention, as compared with the conventional electrode catalyst, and thus the amount of noble metal for the fuel cell electrode can be greatly reduced, and the electrode performance can be greatly improved. Furthermore, addition of carbon fibers can improve the mechanical strength of catalyst layers.

Addition of graphite fluoride to an aqueous solution for preparing electrode catalyst can be more uniformly distributed on the carriers, and even addition of graphite fluoride to the electrode catalyst at the preparation of electrodes can stabilize the electrode performance.

What is claimed is:

1. A fuel cell which comprises at least one gas diffusion electrode, said gas diffusion electrode comprising an electron-conductive, gas-permeable substrate and an electrode catalyst uniformly distributed on the substrate, the electrode catalyst comprising colonies each consisting of not more than about 20 primary particles of nobel metal, with each particle having a size of 10–30 Å, and the colonies being uniformly distributed and deposited on carrier powder.

2. The fuel cell according to claim 1, wherein the electrode catalyst is the one prepared by adding a reducing agent to an aqueous solution containing nobel metal ions or noble metal complex ions, a hydrophillic polymer compound, and carrier powder, thereby depositing the primary particles of noble metal onto the carrier powder.

3. The fuel cell according to claim 1, wherein the electrode catalyst is the one prepared by adding a reducing agent and carbon fluoride to an aqueous solution containing noble metal ions or noble metal complex ions, a hydrophillic polymer compound, and carrier powder, thereby depositing the primary particles of noble metal onto the carrier powder.

4. The fuel cell according to claim 2 or 3, wherein the gas diffusion electrode is the one prepared by mixing the electrode catalyst with a water repellent and water, applying the resulting mixture to an electron-conductive, gas-permeable substrate, and baking the coated substrate.

5. The fuel cell according to claim 2 or 3, wherein the gas diffusion electrode is the one prepared by mixing the electrode catalyst with a water repellent, water and at least one of carbon fibers and graphite fluoride, applying the resulting mixture to an electron-conductive, gas-permeable substrate, and baking the coated substrate.

6. The fuel cell according to claim 4 or 5, wherein a dispersing agent is used for mixing the electrode catalyst and water.

7. The fuel cell according to claim 2 or 3, wherein 0.1-20% by weight of the noble metal is used on the basis of the carrier powder.

8. The fuel cell according to claim 7, wherein 1-10% by weight of the noble metal is used on the basis of the carrier powder.

9. The fuel cell according to claim 3, wherein 10-80% by weight of the graphite fluoride is used on the basis of total of the noble metal and the carrier powder.

10. The fuel cell according to claim 2 or 3, wherein deposition of the primary particles of noble metal is carried out by heating-reduction.

11. The fuel cell according to claim 10, wherein the heating-reduction is carried out at about 70° C. for 2-6 hours.

12. The fuel cell according to claim 2 or 3, wherein the reducing agent is methanol, ethanol, isopropanol, 2-methoxyethanol or 1,2-dimethoxyethane.

13. The fuel cell according to claim 2 or 3, wherein 10-90% by volume of the reducing agent is added to the aqueous solution on the basis of the aqueous solution.

14. The fuel cell according to claim 2 or 3, wherein the hydrophillic polymer compound is polyvinyl alcohol, polyvinylmethyl ether, polyvinylpyrrolidone, polymethyl methacrylate, alkylarylpolyether alcohol, gelatin or gum arabic.

15. The fuel cell according to claims 2, 3 or 14, wherein the hydrophillic polymer compound is contained in the aqueous solution in a ratio of the hydrophillic polymer compound to the nobel metal of 0.1-50 by weight.

16. The fuel cell according to claim 2 or 3, wherein the carrier powder supporting the primary particles of noble metal is heated.

17. The fuel cell according to claim 1, wherein the noble metal is one of noble metals belonging to Group VIII of the periodic table, or a mixture thereof.

18. The fuel cell according to claim 17, wherein the noble metal is at least one of Pt, Pd, Rb, Ru and Ir.

19. The fuel cell according to claim 17, wherein the noble metal is platinum.

20. The fuel cell according to claim 1, wherein the carrier powder is carbonaceous powder.

21. The fuel cell according to claim 20, wherein the carbonaceous powder is at least one of graphite, carbon black and activated carbon.

22. The fuel cell according to claim 1, wherein the colonies each consist of less than 10 primary particles of noble metal.

23. The fuel cell according to claim 1, wherein the fuel cell is a phosphoric acid fuel cell.

24. The fuel cell according to claim 1, wherein the fuel cell is a methanol fuel cell.

25. A fuel cell which comprises at least one gas diffusion electrode, said gas diffusion electrode comprising an electron-conductive, gas-permeable substrate and an electrode catalyst uniformly distributed on the substrate, the electrode catalyst comprising colonies each consisting of not more than about 20 primary particles of noble metal, with each particle having a size of 10-30 Å, and the colonies being uniformly distributed and deposited on carrier powder; said electrode catalyst being prepared by adding a reducing agent to an aqueous solution containing ions of said noble metal or complex ions of said noble metal, a hydrophillic polymer compound, and the carrier powder, thereby depositing the primary particles of the noble metal onto the carrier powder as said colonies.

26. A fuel cell which comprises at least one gas diffusion electrode, said gas diffusion electrode comprising an electron-conductive, gas-permeable substrate and an electrode catalyst uniformly distributed on the substrate, the electrode catalyst comprising colonies each consisting of not more than about 20 primary particles of noble metal, with each particle having a size of 10-30 Å, and said colonies being uniformly distributed and deposited on carrier powder; said electrode catalyst being prepared by adding a reducing agent and carbon fluoride to an aqueous solution containing ions of the noble metal or complex ions of the noble metal, a hydrophillic polymer compound, and the carrier powder, thereby depositing the primary particles of the noble metal onto the carrier powder.

27. A fuel cell which comprises at least one gas diffusion electrode, said gas diffusion electrode comprising an electron-conductive, gas-permeable substrate comprised of carbon fibers and an electrode catalyst uniformly distributed on the substrate, the electrode catalyst comprising colonies each consisting of not more than about 20 primary particles of noble metal, with each noble metal particle having a size of 10-30 Å, and said colonies being uniformly distributed and deposited on carrier powder comprised of carbonaceous powder and from about 0.1-20% by weight of the noble metal, on the basis of the carrier powder, being deposited from an aqueous solution containing ions of the noble metal or complex ions of the noble metal, a reducing agent, a hydrophillic polymer compound and the carrier powder.

28. The fuel cell according to claim 27, wherein the aqueous solution additionally contains carbon fluoride in an amount of 10-80% by weight based on the total of the noble metal and the carrier powder.

29. The fuel cell according to claim 27, wherein the hydrophillic polymer compound is contained in the aqueous solution in a ratio of the hydrophillic polymer compound to the noble metal of 0.1-50 by weight.

30. A fuel cell which comprises at least one gas diffusion electrode, said gas diffusion electrode comprising an electrode-conductive gas-permeable substrate of carbon paper and an electrode catalyst uniformly distributed on the substrate, the electrode catalyst comprising colonies each consisting of not more than about 20 primary particles of noble metal, with each particle of noble metal having a size of 10-30 Å, and the colonies being uniformly distributed and deposited on carrier powder comprising carbonaceous powder; the content of said noble metal being 0.1-20% by weight based on the carrier powder.

31. The fuel cell according to claim 30 wherein the carbonaceous powder is at least one of graphite, carbon black and activated carbon.

32. The fuel cell according to claim 31, wherein the noble metal is at least one of Pt, Pd, Rb, Ru and Ir.

* * * * *